US008583321B2

(12) United States Patent
Ranier et al.

(10) Patent No.: US 8,583,321 B2
(45) Date of Patent: Nov. 12, 2013

(54) METHOD AND DEVICE FOR SECURED CONTROL OF ALTERNATOR-STARTER ASSEMBLY COUPLED TO THERMAL ENGINE OF VEHICLE, AND CORRESPONDING ALTERNATOR-STARTER ASSEMBLY AND WIRE LINKS

(75) Inventors: Marc Ranier, Villeneuve le Roi (FR); Brice Lecole, Paris (FR); Regis Gubian, Paris (FR)

(73) Assignee: Valeo Equipments Electriqyues Moteur, Creteil Cedex (FR)

( * ) Notice: Subject to any disclaimer, the term of this patent is extended or adjusted under 35 U.S.C. 154(b) by 694 days.

(21) Appl. No.: 12/808,283

(22) PCT Filed: Dec. 17, 2008

(86) PCT No.: PCT/FR2008/052349
§ 371 (c)(1),
(2), (4) Date: Jun. 15, 2010

(87) PCT Pub. No.: WO2009/081045
PCT Pub. Date: Jul. 2, 2009

(65) Prior Publication Data
US 2011/0049881 A1 Mar. 3, 2011

(30) Foreign Application Priority Data

Dec. 21, 2007 (FR) .................................. 07 60206
Dec. 21, 2007 (FR) .................................. 07 60261

(51) Int. Cl.
*G06F 7/00* (2006.01)

(52) U.S. Cl.
USPC ............... 701/36; 701/22; 701/112; 701/113; 290/31; 180/65.265

(58) Field of Classification Search
USPC ........... 701/22, 112, 113; 290/31; 180/65.265
See application file for complete search history.

(56) References Cited

U.S. PATENT DOCUMENTS

| 6,752,741 | B2 * | 6/2004 | Kahlon et al. ..................... 477/5 |
| 6,817,329 | B2 * | 11/2004 | Buglione et al. ............ 123/179.4 |
| 6,913,558 | B2 * | 7/2005 | Mori et al. ......................... 477/3 |
| 7,037,234 | B2 * | 5/2006 | Kahlon et al. ..................... 477/5 |
| 7,212,910 | B2 * | 5/2007 | Akasaka ....................... 701/112 |
| 7,337,056 | B2 * | 2/2008 | Arai ............................. 701/96 |
| 7,532,973 | B2 * | 5/2009 | Akasaka ....................... 701/112 |
| 2003/0150417 | A1 * | 8/2003 | Miwa ......................... 123/179.4 |

(Continued)

FOREIGN PATENT DOCUMENTS

EP  0 793 013 A1  9/1997
FR  2 855 677 A1  12/2004

(Continued)

*Primary Examiner* — James Trammell
*Assistant Examiner* — Majdi Alsomiri
(74) *Attorney, Agent, or Firm* — Berenato & White, LLC

(57) ABSTRACT

An electric control unit is used to generate control signals for the alternator-starter assembly on the basis of first information signals representative of a state of the vehicle and a control unit is used to generate control signals for power circuits on the basis of diagnosis signals representative of the state of the alternator-starter assembly. The control signals are generated using the electronic control unit also on the basis of at least one first diagnosis signal, and control signals are generated using the control circuit also on the basis of second information signals from a data communication bus.

16 Claims, 8 Drawing Sheets

(56) References Cited

U.S. PATENT DOCUMENTS

2009/0206786 A1* 8/2009 Lecole et al. ............... 318/521
2009/0216430 A1* 8/2009 Lecole et al. ............... 701/112
2010/0274425 A1* 10/2010 Ranier et al. ............... 701/22
2011/0049881 A1* 3/2011 Ranier et al. ............... 290/31

FOREIGN PATENT DOCUMENTS

| FR | 2 875 549 A1 | 3/2006 |
| FR | 2 875 551 A1 | 3/2006 |
| FR | 2 875 557 A1 | 3/2006 |
| FR | 2 881 295 A1 | 7/2006 |

* cited by examiner though<br>

METHOD AND DEVICE FOR SECURED CONTROL OF ALTERNATOR-STARTER ASSEMBLY COUPLED TO THERMAL ENGINE OF VEHICLE, AND CORRESPONDING ALTERNATOR-STARTER ASSEMBLY AND WIRE LINKS

TECHNICAL FIELD OF THE INVENTION

The present invention relates to a method and device for failsafe control of an alternator-starter coupled to a thermal engine of a vehicle.

The invention also relates to an alternator-starter system which can implement the method and comprises this device.

TECHNOLOGICAL BACKGROUND OF THE INVENTION

Considerations of energy saving and reduction of pollution, particularly in an urban environment, are leading motor vehicle manufacturers to equip their models with an automatic system for stopping/re-starting the thermal engine (known as the "automatic engine stop/re-start system" hereinafter in the description), such as the system known by the term "stop and go".

As recalled by the company VALEO EQUIPEMENTS ELECTRIQUES MOTEUR in patent application FR2875549, it is possible for vehicles to function according to the "stop and go" mode by means of a reversible electrical machine, or alternator-starter, which is coupled to the thermal engine, and is supplied by an inverter in "starter" mode.

The use of an alternator-starter system in a "stop and go" functioning mode consists in certain conditions of giving rise to complete stoppage of the thermal engine when the vehicle itself is at a standstill, then of re-starting the thermal engine, as the result for example of action by the driver which is interpreted as a request to re-start the thermal engine.

A typical "stop and go" situation is that of stoppage at a red light. When the vehicle stops at the light, the thermal engine is automatically stopped, then, when the light turns to green, the engine is re-started by means of the alternator-starter system, as the result of diagnosis, by the system, of the clutch pedal being pressed down by the driver, or any other action which represents the wish of the driver to give rise to movement of his vehicle.

For this purpose, as the company VALEO EQUIPEMENTS ELECTRIQUES MOTEUR also indicates in patent application FR2875551, the "stop and go" system uses information representative of the state of functioning of the vehicle which is obtained from sensors of the vehicle, such as temperature sensors in the passenger space, or detection of the position of the clutch pedal, or information read on a data communication bus, such as the speed of the vehicle or the speed of rotation of the engine.

It will be appreciated that the automatic re-starting function carried out by an alternator-starter system is a function which must assure a certain level of safety of functioning.

As described by the company VALEO EQUIPEMENTS ELECTRIQUES MOTEUR in patent application FR287557, the essential characteristic of a method for controlling an alternator-starter system in starter mode is that it must comprise steps of verification of so-called prior conditions for re-starting of the engine before the re-starting phase takes place, and so-called "safety" conditions throughout the phase of re-starting of the engine.

A prior condition for restarting of the engine is determined in particular by at least one intentional action of the driver, for example pressing the clutch pedal down by more than 90%.

An additional condition is, for example, that the network on board the vehicle must be supplied, i.e. the contact key of the vehicle must be in the position +APC "after contact", and the traction chain must be open.

In fact, when the vehicle is at a standstill (i.e. with zero speed) and the thermal engine is stopped by the automatic function, there is no question of re-starting the engine unless it is certain that the traction chain is open.

If the chain were closed, re-starting the engine could impel the vehicle, and consequently make it advance (or reverse), thus endangering the safety of property or people.

Thus, in order to avoid this type of situation, a solution is now implemented which uses a specific control line Auth. Ond., in order to authorise the control of the inverter. This specific control line Auth. Ond. is derived from a control system of the vehicle, which is external to the automatic stop/re-start function, thus fulfilling most of the safety requirements.

In addition, in order to detect the activated state of the electrical machine, a supplementary safety device is introduced. This safety device is constituted by the line Diag.1 Ond., which conveys information which indicates the rotation of the electrical machine, and is obtained from signals from position sensors of the rotor.

This information is then put into form by the microprocessor for control of the electrical machine, and is transmitted to the microprocessor of the electronic control unit of the vehicle, amongst the state and faults signals.

This solution fulfils most of the safety requirements inherent in the function, but reveals certain disadvantages.

In fact, the information Diag 1. Ond. is made available to the electronic control unit of the vehicle only when the microprocessor to control the electrical machine is functional. This involves a certain software delay in order to become reactive when the information is not present (delay to detect the absence of information).

Another disadvantage is that this solution requires use of a microprocessor with a large processing capacity, since the microprocessor to control the electrical machine must control and monitor the machine, as well as support all or part of the system strategy, whilst providing the interface towards the exterior.

This solution is also not suitable for the case in which the electrical machine is used both for re-starting of the thermal engine and for torque assistance.

A simple control line Auth. Ond. cannot be used to prevent both re-starting and torque assistance operations. In fact, the re-starting function can be activated only if the traction chain is open, whereas the torque assistance function can be activated only when the traction chain is closed. These two conditions are contradictory.

There is consequently a need for a new architecture which makes it possible to eliminate all of these problems, whilst increasing the level of safety of the global functionality.

GENERAL DESCRIPTION OF THE INVENTION

The object of the present invention is to fulfill this need, and its objective is specifically a failsafe control method for an alternator-starter system which is coupled to a thermal engine of a vehicle.

The vehicle in question is in itself known, and comprises at least one electronic control unit, vehicle sensors, a data communication bus, and an on-board electrical network.

Systems with an alternator-starter conventionally comprise at least one rotary electrical machine which is provided with a means for detection of rotation, power circuits comprising at least one inverter and an excitation circuit which supplies the rotary electrical machine, and is a circuit to control the power circuits.

In a known manner, the failsafe control method of this alternator-starter system is of the type consisting of generating by means of the electronic control unit signals to control the alternator-starter system, on the basis of first information signals Capt. Véh. which are representative of a state of functioning of the vehicle, obtained from the vehicle sensors; and generating by means of this control circuit signals to control the power circuit, on the basis of diagnostic signals which are representative of a state of functioning of the alternator-starter system.

The failsafe control method of this alternator-starter system according to the invention is distinguished in that it additionally consists of:

generating the control signals by means of the electronic control unit, on the basis in addition of at least one first diagnostic signal Diag1. Ond. from amongst the diagnostic signals which are representative of a state of functioning of the alternator-starter system; and generating the control signals by means of the control circuit, on the basis in addition of second information signals which are obtained from the data communication bus.

Preferably, at least one first control signal Cd. Exc. from amongst the control signals constitutes at least one second diagnostic signal Diag1. Exc. from amongst the diagnostic signals which are representative of a state of functioning of the alternator-starter system.

Highly advantageously, the method for failsafe control of an alternator-starter according to the invention additionally consists of:

generating at least one first control signal Dd. Ond. and/or Dd. Exc. from amongst the control signals, by means of a first microprocessor which is provided in the electronic control unit, and processing at least the first and second diagnostic signals Diag. Ond., Diag1. Exc.;

generating at least one second control signal Auth. Ond. from amongst the control signals, by means of a first wired logic decision-making circuit which is provided in the control unit; and generating control signals Cd. Ond. and Cd. Exc. exclusively by means of a second wired logic decision-making circuit which is provided in the control circuit.

Advantage is derived from the fact that this failsafe method for control of an alternator-starter system also consists of:

generating at least the second control signal Auth. Exc. as a function of at least one first activation signal Act. Exc. from amongst activation and/or inhibition signals which are generated by the first microprocessor, and a contact signal which is representative of switching on of the on-board electrical network; and generating at least the first control signal Cd. Exc. as a function of the second control signal Auth. Exc., and at least one first control signal Pil. Exc., from amongst control signals which are generated by a second microprocessor which is provided in the control circuit.

In addition, state/fault signals are advantageously transmitted by means of the second microprocessor to the first microprocessor.

In the failsafe control method according to the invention, the excitation circuit is controlled by the first control circuit Cd. Exc., which is obtained for reasons of reliability from the second wired logic circuit, where it has been validated by the second control signal Auth. Exc.

The first diagnostic signal Diag.1. Ond. is preferably provided by the means for detection of rotation.

The invention also relates to a failsafe control device of an alternator-starter system coupled to the thermal engine of a vehicle, which is designed for implementation of the above-described method.

This device is of the type in which:

the electronic control unit of the vehicle receives first information signals which are representative of a state of functioning of this vehicle, obtained from the vehicle sensors, and generates signals for control of the alternator-starter system;

the circuit for control of the power circuits, i.e. at least one inverter and one excitation circuit, receives diagnostic signals which are representative of a state of functioning of the alternator-starter system, and generates signals for control of the power circuits.

The failsafe control device according to the invention is distinguished in that:

the electronic control unit of the vehicle additionally receives at least one first diagnostic signal Diag.1. Ond. from amongst the diagnostic signals; and the control circuit additionally receives second information signals from the data communication bus.

In this device, advantage is derived from the fact that at least one first control signal Cd. Exc. from amongst the control signals of the power circuits constitutes at least one second diagnostic signal Diag1. Exc. from amongst the diagnostic signals.

Highly advantageously, the device according to the invention additionally comprises:

a first microprocessor which is provided in the electronic control unit of the vehicle, which processes at least the first diagnostic signal Diag1. Exc., and the second diagnostic signal Diag1. Exc., and generates at least one first control signal Dd. Ond. and/or Dd. Exc. from amongst the control signals of the alternator-starter system;

a first wired logic decision-making circuit which is provided in the control unit of the vehicle, and generates at least one second control signal Auth. Exc. from amongst the control signals; and a second wired logic decision-making circuit which is provided in the control circuit, and generates the control signals Cd.Ond. and Cd. Exc. of the power circuits.

The device according to the invention additionally comprises:

a first logic gate which produces the second control signal Auth. Exc., or a plurality of signals, as a function of at least one first activation signal Act. Exc. from amongst activation signals Act. Exc. and/or inhibition signals Inh. Ond. generated by the first microprocessor, and of a contact signal +APC/Vbat, which is representative of switching on of the on-board electrical network;

a second microprocessor, which is provided in the control circuit of the power circuits, and generates control signals Pil. Ond. and Pil. Exc.; and a second logic gate which generates the first control signal Cd. Exc., or a plurality of signals, as a function of the second control signal Auth. Exc., and at least one first control signal Pil. Exc. from amongst the control signals Pil. Ond. and Pil. Exc.

Preferably, the second microprocessor transmits state/fault signals to the first microprocessor, and advantageously, it is the first control signal Cd. Exc. which controls the excitation circuit.

The first diagnostic signal Diag1. Ond. is preferably provided by the means for detection of rotation.

The invention also relates to an alternator-starter system which is designed for a thermal engine of a vehicle comprising the failsafe control device previously described, and, in particular, an alternator-starter system comprising a recuperative braking function of the micro-hybrid type.

These few essential specifications will have made apparent to persons skilled in the art the advantages provide by the invention, in comparison with the prior art.

The detailed specifications of the invention are given in the following description, in association with the appended drawings. It should be noted that the sole purpose of these drawings is to illustrate the text of the description, and that they do not constitute in any way a limitation of the scope of the invention.

DESCRIPTION OF THE PREFERRED EMBODIMENTS OF THE INVENTION

Figure 1:
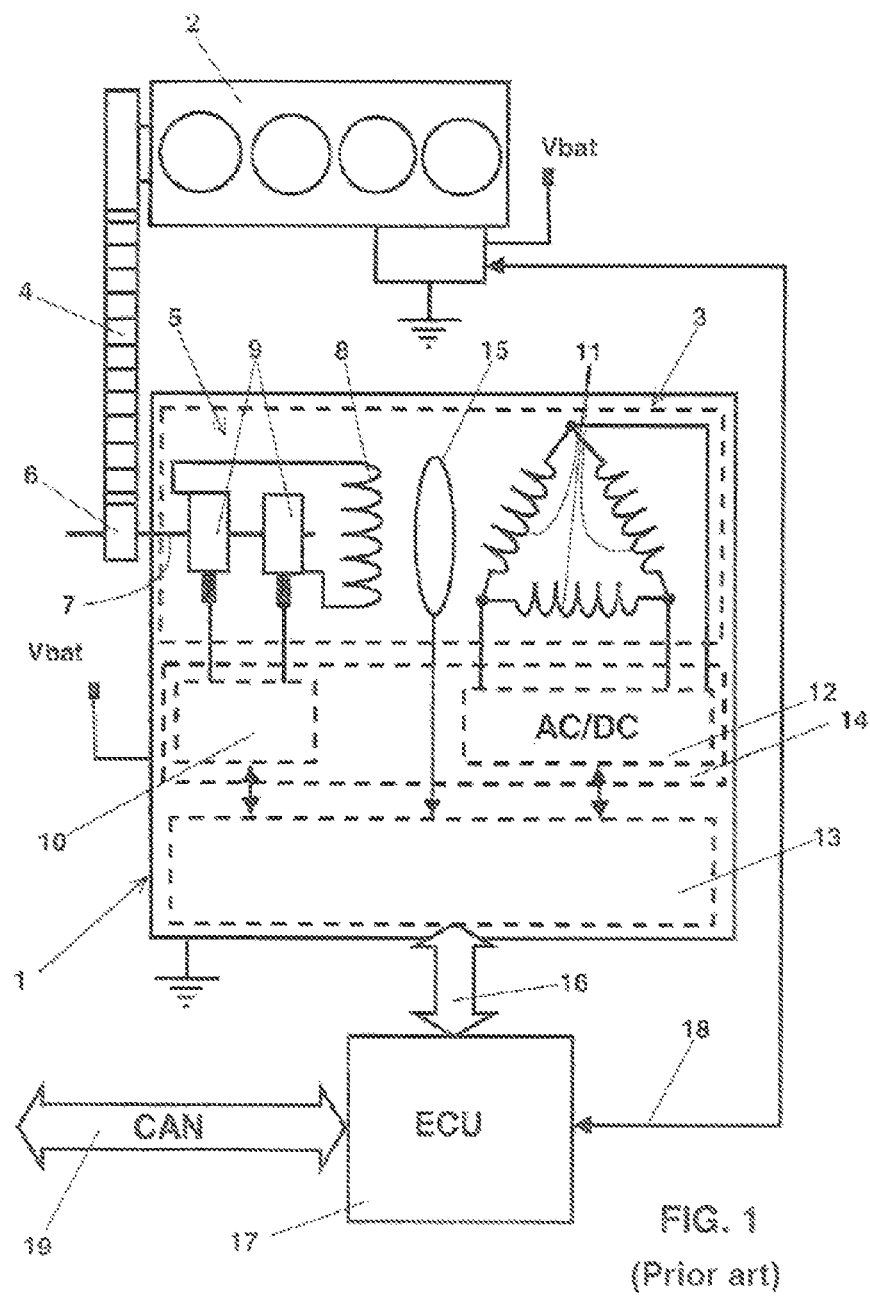
FIG. 1 is a schematic representation of a known alternator-starter system coupled to a thermal engine of the vehicle.
Figure 2:
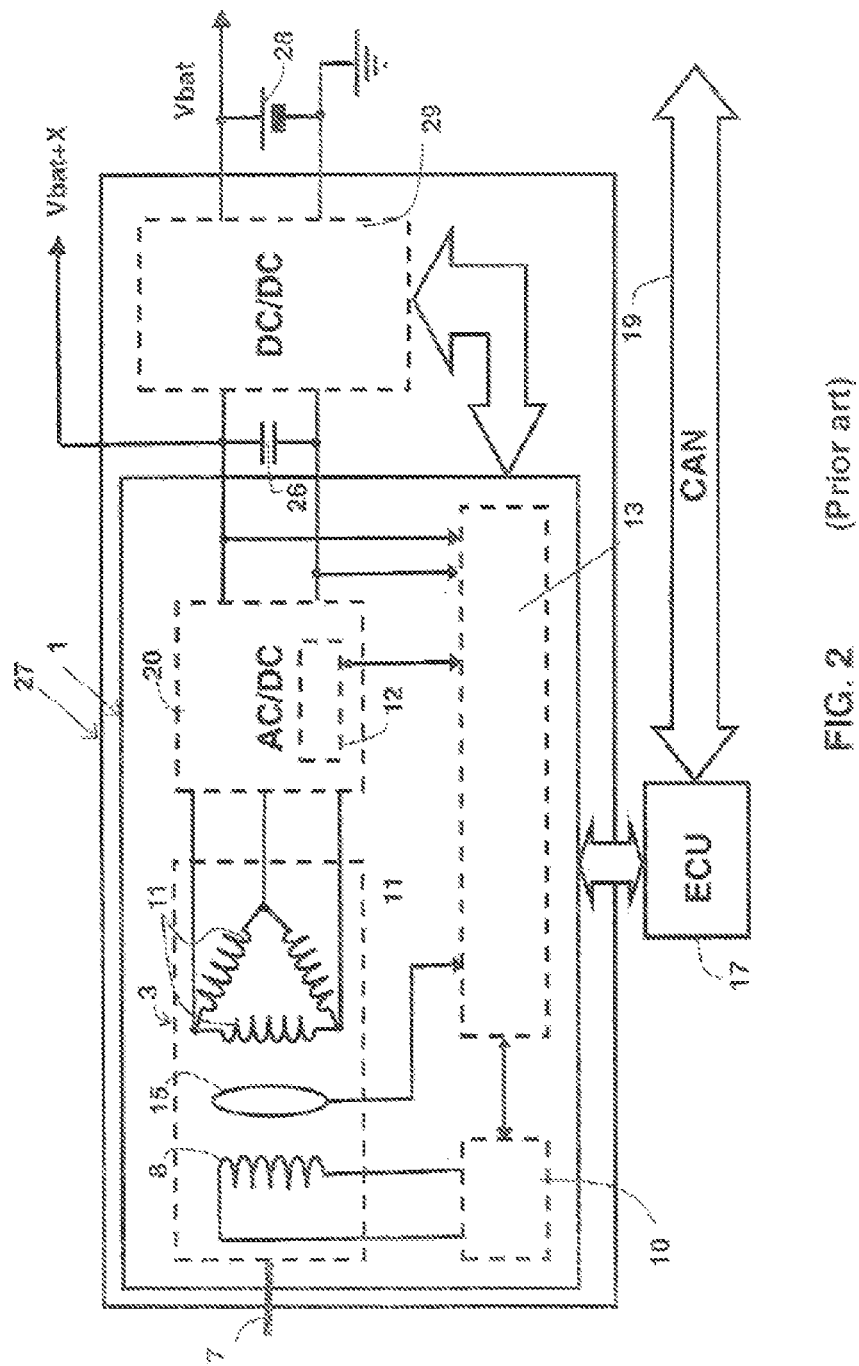
FIG. 2 is a schematic representation of a known micro-hybrid system with recuperative braking and/or alternator-starter torque assistance, which is coupled to a thermal engine of the vehicle.

The preferred embodiments of the invention concern vehicles which are equipped with an alternator-starter system, with or without an energy recuperation device during braking, as represented schematically in FIGS. 1 and 2 respectively.

FIG. 1 shows as alternator-starter system 1 coupled to a thermal motor 2 of the vehicle.

This alternator-starter system 1 comprises a reversible electrical machine 3 which is coupled to the engine 2 by means of a drive 4 by means of a belt and pulleys.

The electrical machine 3 comprises a rotor 5 which is integral with an output pulley 6 at the end of a shaft 7. The rotor 5 has an inductor 8 which is supplied by means of a collector 9 which is rotated by an excitation circuit 10.

The machine 3 also comprises phase or armature windings 11, which are supplied by an inverter 12.

A control circuit 13 controls the power circuits 14 of the machine 3, constituted by the inverter 12 and the excitation circuit 10, according to the information provided by a position sensor 15 of the rotor 5, and control signals 16 which are generated by an electronic control unit 17, 17a of the vehicle.

The electronic control unit 17, 17a receives parameters of functioning of the engine 2 and other context information by means of dedicated wired connections 18 or via the on-board data communication bus 19 of the CAN type.

The inverter 12 is preferably constituted by a chopper circuit 20 for the on-board supply voltage Vbat which generates pulses, the frequency and width of which are controlled by the control circuit 13.

The chopper circuit 20 is a reversible alternating—direct converter which functions as a synchronous rectifier 21 when the alternator-starter system 1 is functioning as an alternator.

As already explained, the automatic re-starting function which is carried out by a alternator-starter system 1 is a function which must assure a certain level of safety of functioning.

In fact, when the vehicle is at a standstill (i.e. with zero speed) and the engine 2 is stopped by the function, there is no question of re-starting the engine unless it is certain that the traction chain is open.

Figure 3:
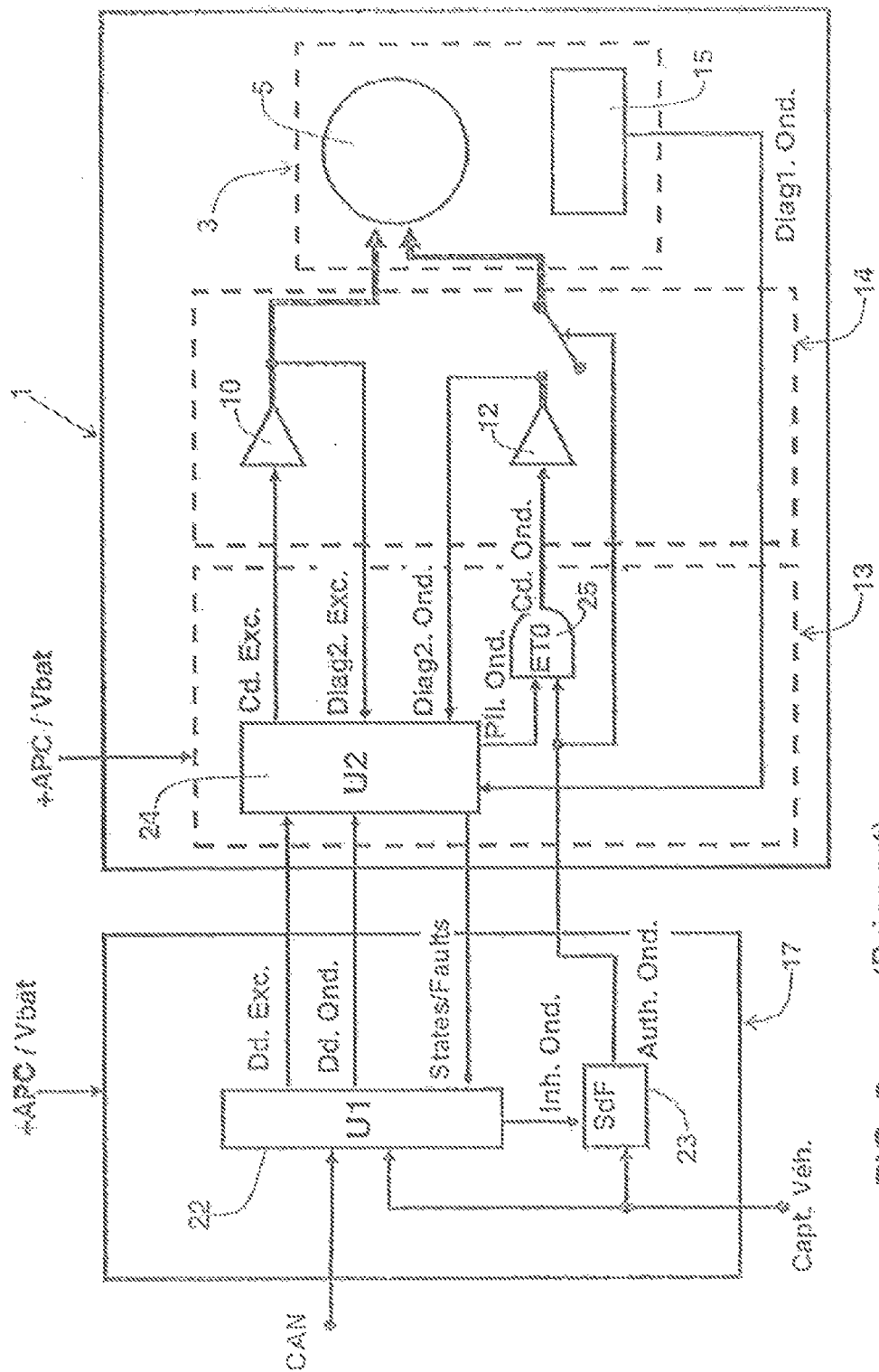
FIG. 3 is a flowchart of a known failsafe control device for the case of an alternator-starter system of the type represented in FIG. 1.

The known solution which has already been implemented in order to avoid this type of situation is represented in FIG. 3.

FIG. 3 shows in greater detail the control circuit 13 and the electronic control unit 17, 17a, in FIG. 1.

The electronic control unit 17, 17a of the vehicle, which is supplied by the battery voltage Vbat or an after-contact +APC, comprises a first microprocessor 22, and a first wired logic decision-making circuit 23, which receive first information signals Capt. Véh. obtained from the vehicle sensors, and generate the control signals Dd. Exc., Dd. Ond., Auth. Ond. of the control circuit 13, i.e. a request for closure of the excitation circuit Dd. Exc., a request for the start of functioning of the inverter Dd. Ond., and authorisation for the start of functioning of the inverter Auth. Ond.

The control circuit 13, which is also supplied by the battery voltage Vbat or an after-contact +APC, comprises a second microprocessor 24 and an AND gate 25, which receive the control signals Dd. Exc., Dd. Ond., Auth. Ond. from the electronic control unit 17, 17a, and generate the signals to command closure of the excitation circuit Cd. Exc. and for the start of functioning of the inverter Cd. Ond. which control respectively the excitation circuit 10 and the inverter 12 of the power circuits 14.

The second microprocessor 24 additionally receives diagnostic signals Diag2. Exc., Diag2. Ond. on the state of closure of the excitation circuit 10 and the start of functioning of the inverter 12, respectively.

At the same time, the second microprocessor 24 diagnoses the speed of the rotary electrical machine 3 by means of a dedicated line Diag1. Ond. which is connected to the position sensor 15 of the machine 3.

The functioning states and faults of the alternator-starter system 1 are indicated to the first microprocessor 22 of the electronic control unit 17, 17a by the transmission of state/fault signals States/Faults obtained from the control circuit 13.

Use is made of a dedicated inhibition line Inh. Ond, obtained from the first microprocessor 22, which validates or does not validate the authorisation Auth. Ond. for the start of functioning of the inverter 12, generated by the first wired logic decision-making circuit 23, in order to fulfill most of the requirements of safety of functioning SdF associated with the re-starting function, as previously described.

The signal Auth. Ond. for authorisation for the start of functioning of the inverter 12, applied to an input of the AND gate 25 of the control circuit 13, the output Cd. Ond. of which controls the inverter 12, validates the control signal of the inverter Pil. Ond. which is generated by the second microprocessor 24, and applied to the other input.

The fact that the control of the start of functioning of the inverter 12 is carried out by the first microprocessor 22 outside the function, and by wired logic decision-making circuits, contributes towards reinforcing the safety.

However, the device for failsafe control of an alternator-starter system 1 represented in FIG. 3 has some weaknesses, i.e.:

firstly, the diagnosis Diag1. Ond. of the activation of the engine mode of the reversible AC/DC converter 20 is emitted only to the second microcontroller 24 of the control circuit 13 of the inverter 12. Consequently, the information is made available to the electronic control unit of the vehicle 17, 17a only when the second microprocessor 24 is functional. This involves a certain software delay in order to become reactive, when the information is not available (time for detection of the lack of information).

secondly, the inverter 12 is activated by a unit outside the system, and, in the case of an architecture of the micro-hybrid type, or so-called "14+X" type, as represented schematically in FIG. 2 (i.e. when there is an intermediate energy storage unit 26 and the capacity to provide a function of engine torque assistance), it is necessary either to:

modify the vehicle architecture and/or units external to the supply, in the case when the function is present;

or use another architecture which does not suffer from this problem when an autonomous function is to be used, i.e. a function which will have the smallest possible impact (or even none at all) on components external to the supply. It is this latter solution which is described hereinafter in association with FIGS. 6a and 6b, and the principle of which consists of using two control circuits 17a, 13 which are implemented within the system 27; these circuits, which each contain a microprocessor 22, 24, are arranged such that they monitor one another (for example, the second control circuit 13 monitors the first control circuit 17a in order to inhibit its demands, in the case when it has been detected that its microprocessor 22 is defective, or is triggering premature action, i.e. undesirable action), which makes it possible to render the activation of the engine mode safe (torque assistance, or starting/re-starting) whilst avoiding the use of more costly safety solutions, for example within the control electronics of the rotary electrical machine 3.

thirdly, in the case of a micro-hybrid system of the so-called "14+X" type, whereas many resources of the second microprocessor 24 are used for the monitoring and control of the electrical machine 3, in the case of the alternator-starter system 1 represented in FIG. 1, the second microprocessor 24 is at the same time the unit for interface with the exterior of the system, which requires a very large processing capacity (in order to provide both the interface towards the exterior and the machine control). In addition, it must also support all or part of the system strategy.

fourthly, certain safety solutions cannot be implemented in the case of an architecture of the "14+X" type.

An architecture of the "14+X" or micro-hybrid type is represented in FIG. 2.

Like the conventional alternator-starter system represented in FIG. 1, the micro-hybrid system 27 comprises a rotary electrical machine 3 with an inverter 8 which is supplied by an excitation circuit 10, phase windings 11 which are supplied by a reversible AC/DC converter 20 which functions as an inverter 12, and a sensor 15 for the position of the rotor 8.

However, unlike the conventional alternator-starter system, the inverter 12 is supplied by a super-capacitor 26, instead of being connected directly to the on-board battery.

When functioning as a generator, the electrical machine 3 charges the super-capacitor 26 by means of the reversible AC/DC converter 20 functioning as a rectifier, and supplies the on-board electrical network with a voltage Vbat+X which is higher than the battery voltage Vbat.

Energy conversion circuits 29 which are constituted by a DC/DC converter make possible exchanges of electrical energy between the on-board battery 28, which supplies a first on-board network at the voltage Vbat, and the super-capacitor 26, which supplies a second on-board network at the voltage Vbat+X.

A control circuit 13 controls the excitation circuit 10, with the reversible AC/DC converter 20, including the inverter 12, constituting the power circuits 14 of the alternator-starter system 1, and the energy conversion circuits 29.

The control circuit 13 is controlled by an electronic control unit 17, 17a, which is interfaced with the CAN bus 19.

The micro-hybrid system 27 which is represented in FIG. 2 makes it possible to implement a recuperative and/or torque assistance braking function: part of the mechanical energy from the braking which is transformed into electrical energy by the electrical machine 3 functioning as a generator, and is stored in the super-capacitor 26, is used to provide additional torque for the thermal engine 2, by making the electrical machine 3 function as an electric motor.

However, as already seen, it is not possible to provide protection in a micro-hybrid system 27, as in a conventional alternator-starter system 1, both against premature functions of re-starting and/or torque assistance, by means of a simple inhibition line Auth. Ond.

In fact, the re-starting function can be activated only if the traction chain is open, whereas the torque assistance function can be activated only when the traction chain is closed. These two conditions are therefore contradictory.

Figure 4:
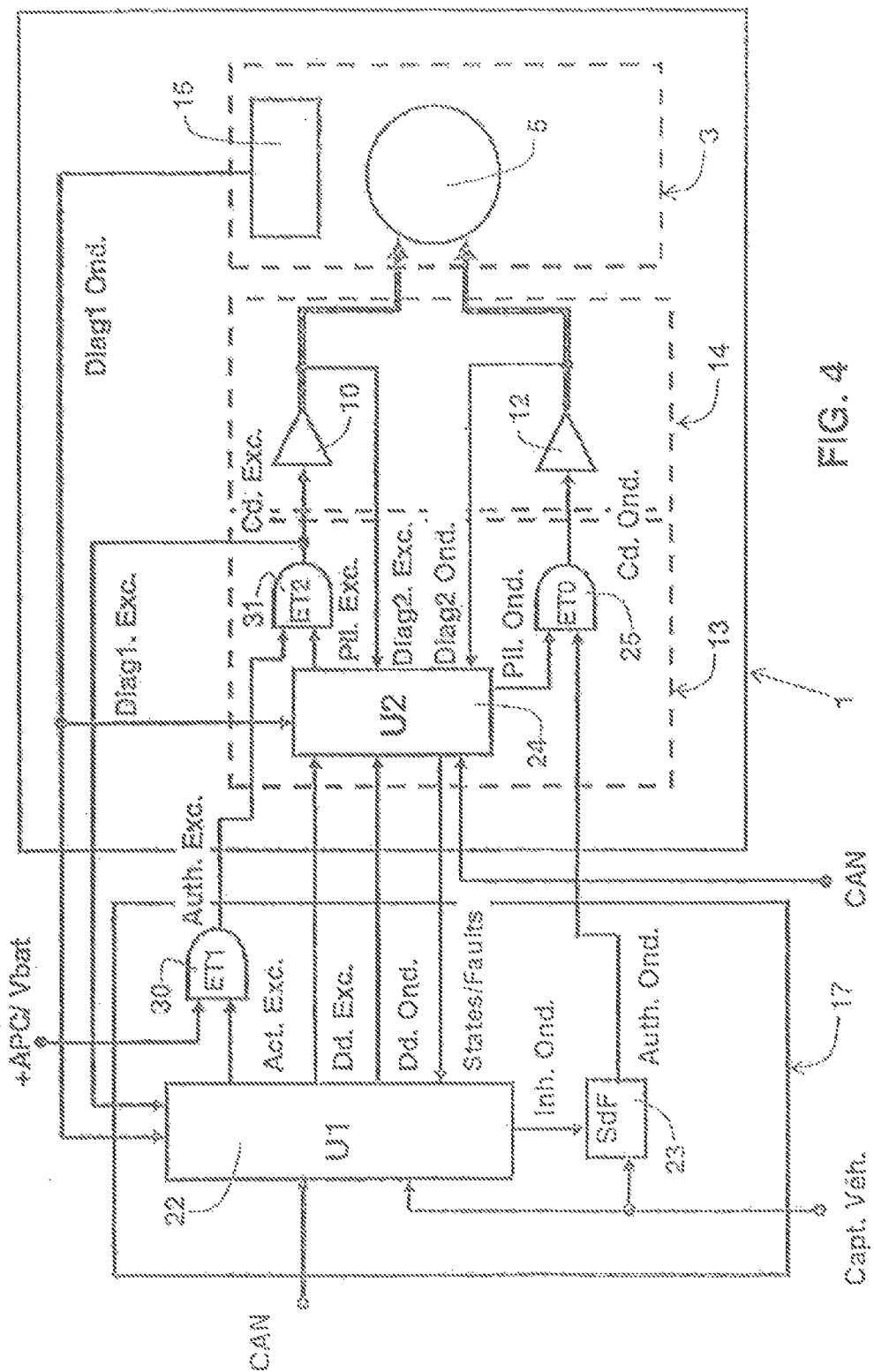
FIG. 4 represents a flowchart showing wired connections and a failsafe control device according to the invention, for the case of an automatic alternator-starter stop/re-start system of the type represented in FIG. 1.
Figure 5:
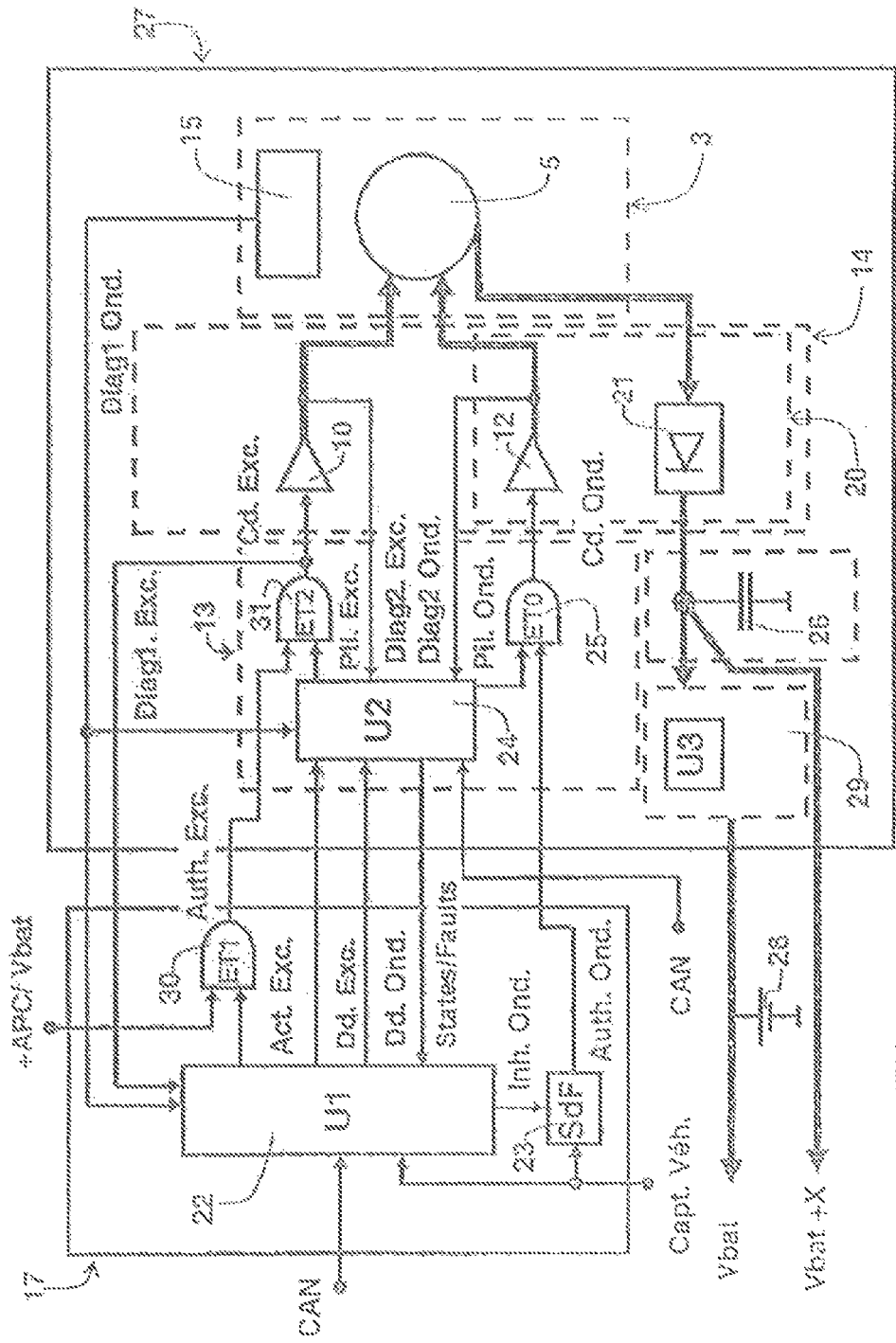
FIG. 5 is a flowchart showing wired connections and a failsafe control device according to the invention, for the case of a micro-hybrid system with recuperative braking and/or torque assistance, of the type represented in FIG. 2.

FIG. 4 shows a safety solution applied to the conventional alternator-starter system 1 shown in FIG. 1, which also applies to the micro-hybrid system 27 shown in FIG. 2, as shown in FIGS. 5 and 6.

According to a general principle of the invention, within the context of a system which carries out functions of automatic re-starting and/or engine torque assistance functions, it is proposed to use an architecture which is distributed as follows:

firstly, a so-called decision-making unit (where the high-level strategies are implemented), such as the electronic control unit 17, 17a of the vehicle, or another available processing unit; and secondly, an execution unit (the reversible machine 3 and its associated electronics 13, 14) controlled by the above-described decision-making unit.

Distribution of the architecture thus in two separate units avoids the introduction of additional safety devices into the conventional alternator-starter system 1 represented in FIG. 1, such as an additional microcontroller.

In addition, use of two microprocessors 22, 24 which are separate, but which, within the context of an architecture of the micro-hybrid type, as shown in FIGS. 2 and 6, optionally belong to the micro-hybrid system 27, also avoids modification of the architecture of the vehicle, in the case in which the function is not present.

Figure 6A:
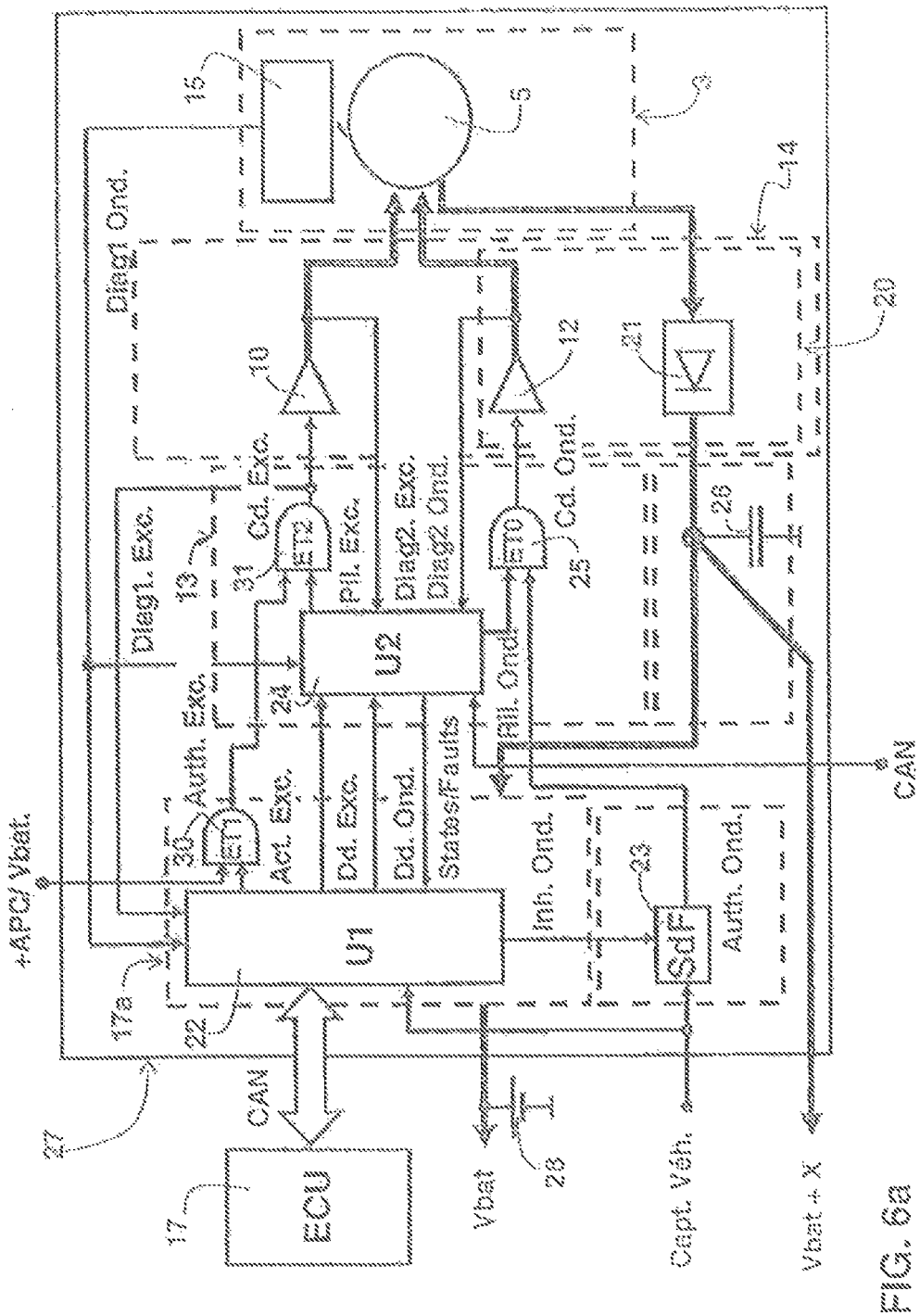
FIG. 6a is a flowchart showing the wired connections, according to the invention, of a first preferred embodiment of the failsafe control device of a micro-hybrid system with recuperative braking and/or torque assistance, of the type shown in FIG. 2, in a variant embodiment.
Figure 6B:
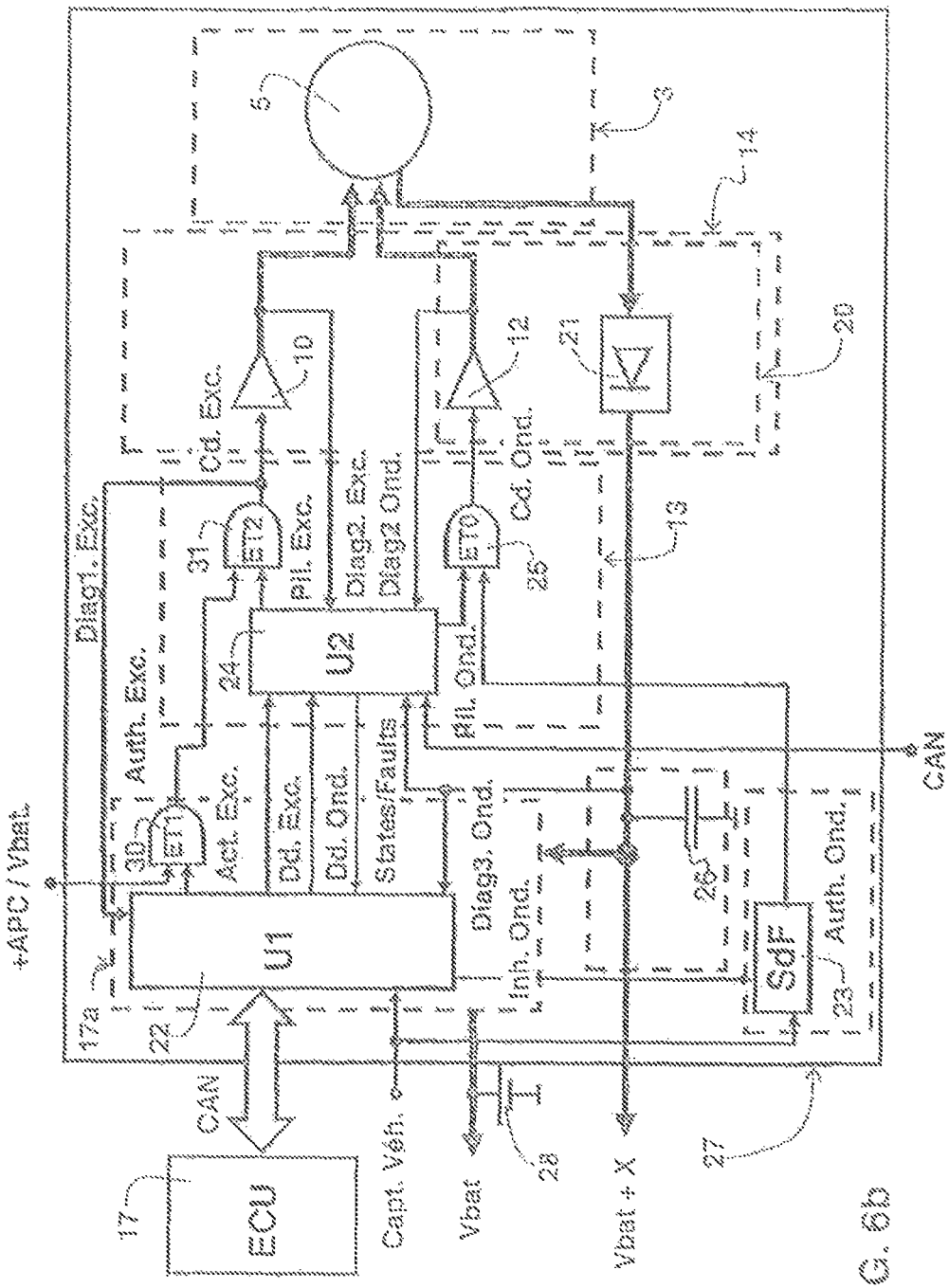
FIG. 6b is a flowchart showing the wired connections, according to the invention, of a second preferred embodiment of the failsafe control device of a micro-hybrid system with recuperative braking and/or torque assistance, of the type shown in FIG. 2, in a variant embodiment.

In the architecture represented in FIGS. 6a and 6b, the first microprocessor 22 is the one which is already present in a second control circuit 17a of the energy conversion circuits 29, which therefore has the function of the first microprocessor 22 of the electronic control unit 17 represented in FIG. 4. The second control circuit 17a then plays the part, in the architecture represented in FIGS. 6a and 6b, of the electronic control unit 17 represented in FIG. 4.

In addition, in order to solve the problems associated with premature activation of the engine mode (premature activation of the re-starting and/or torque assistance functions), the architecture between the two microprocessors 22, 24 is constrained, in particular in order to avoid triggering one of these modes prematurely in the case of simple breakdown of one of the two microprocessors 22, 24 (increase in the level of safety of the global function).

In order to avoid a problem with a simple breakdown of the first microprocessor 22 of the electronic control unit 17, 17a, it is necessary to implement within the second microprocessor 24 of the control circuit 13 power circuits 14 for the strategies for evaluation or diagnosis of the orders issued by the electronic control unit 17,17a.

The purpose of these strategies is not to authorise the implementation of a request by the electronic control unit 17, 17a, for example a request for closure of the excitation circuit Dd. Exc., or for use of the inverter Dd. Ond., when this is considered inappropriate.

For this purpose, the control circuit 13 of the power circuits 14 must receive from outside the system certain context information (by way of example: the speed of the vehicle, the state of the engine, or the state of the traction chain), for example (and preferably) by means of the vehicle on-board CAN network, so as to avoid affecting the cost of the function with a large number of additional inputs and outputs.

In these conditions, the alternator-starter system 1 becomes an intelligent actuator, in that it can then refuse one of the requests Dd. Exc. or Dc. Ond. of the electronic control unit 17, 17a.

In order to eliminate the problem of a simple breakdown of the second microprocessor 24 provided in the execution unit (control circuit 13 of the power circuits 14, including the inverter 12), it is necessary:
  either to make the request for activation downstream from the second microprocessor 24 secure, for example by means of a logic AND 25 between a control signal of the inverter Pil. Ond. obtained from the second microprocessor 24, and a signal Auth. Ond. which is not generated by this second microprocessor 24 (a solution which has been explained in association with FIG. 3, according to the prior art);
  or to diagnose by means of the first microprocessor 22 of the electronic control unit 17, 17a the activation of the power circuits 14 (for example by means of a diagnostic line Diag1. Exc.), and to make the latter act accordingly.

(It will be noted that, by this means, action is not taken concerning the cause, since activation of the power circuits 14 will be commanded, but the risk is reduced, since this mode does not last for long, i.e. for time of the loop).

It is also possible to combine these two types of safety devices by using the first type of safety device for example for the "re-starting" function, and using the second type of safety device for the "torque assistance" function (or vice-versa); this makes it possible to eliminate the aforementioned problem concerning the "traction chain" condition.

Also, these two safety devices can be produced going from or towards the electronic control unit 17, 17a, which allows them to be available even in the event of failure of the second microprocessor 24 of the execution unit 13. Within the context of a micro-hybrid system of the "14+X" type, this solution has the advantage of not affecting the remainder of the electrical architecture of the vehicle (in particular within the context of an optional function).

FIG. 4 shows implementation of the above-described principles in the case of a conventional alternator-starter system 1 of the type represented in FIG. 1.

In this architecture, the decision-making unit, which is constituted by the electronic control unit 17, 17a of the vehicle, acquires first information signals Capt. Véh. obtained from outside the system, and uses these first information signals in order to generate a signal Auth. Excit. for authorisation for excitation of the electrical machine 1.

This excitation authorisation signal Auth. Exc. is conveyed to the excitation circuit 10, preferably by a first dedicated wired connection, in order to permit excitation of the machine 3.

As shown in FIG. 4, the excitation can take place only by means of a first control signal Cd. Exc. derived from the validation of a first control signal Pil. Exc. by the excitation authorisation signal Auth. Exc. of the electronic control unit 17, 17a.

The first control signal Pil. Exc. is generated by the second microprocessor 24 in response to a request for closure of the excitation circuit Dd. Exc. obtained from the electronic control unit 17, 17a.

Between this request Dd. Exc. (input of the second microprocessor 24) and the command (output from the second microprocessor 24), a process for validation of the order may be implemented in order to prevent activation of the excitation, as a result of a simple error by the first microprocessor 22 of the electronic control unit 17, 17a. This validation process is carried out by means of information signals obtained from the data communication bus of the vehicle CAN.

The validation process can assume different forms, and in particular, by way of example:
  Verification of the compatibility between the request for activation of the generator or engine modes (starter or torque assistance), and the information concerning the presence of the information after contact.

This validation process complements the authorisation signal Auth. Exc., which validates the first control signal Pil. Exc. in a first AND logic gate 31, as shown in FIGS. 4 and 6.

As a variant, anticipation of activation of the putting into contact is applied to this signal for authorisation of the excitation Auth. Exc., in order to pre-flux the electrical machine 3.

In this case, the anticipation signal can assume several values, such as (by way of example):
  Remote unlocking of the vehicle;
  Detection of approach of an authorised user;
  Opening of a door;
  Closure of a door;

Insertion of the contact key;

Pressing on the clutch pedal;

Pressing on the brake pedal AND gear lever in the neutral position.

As shown in FIGS. 4 and 6, the switching of Auth. Exc. is preferably carried out in the electronic control unit 17, 17a by means of the information supplied to the first microprocessor 22 by means of the data communication bus of the vehicle CAN. This is carried out by validation of the signal Act. Exc. for activation of the excitation. This signal is then transformed into a signal for authorisation of the closure of the excitation circuit Auth. Exc. only after having been validated in a second AND logic gate 30 by the contact signal +APC/Vbat, which is representative of switching on of the on-board electrical network.

This is particularly advantageous in the case of a micro-hybrid system 27, as shown in FIG. 5 or 6, where an energy storer 26 is available, since in this case it is possible to act on this authorisation signal Auth. Exc. by means of the signal Act. Exc., and thus prevent the excitation when a storer 26 fault is detected (identified by an additional diagnostic signal in a device which is described in the previously cited co-dependent application), which makes it possible to increase the level of safety of the global function by decreasing the general risk of short-circuiting at the level of the electrical machine 3.

The failsafe control for putting the inverter 12 into action is based on the same principles as for the excitation circuit 10.

It has already been seen in association with FIG. 3 that the electronic control unit 17, 17a of the vehicle acquires information signals Capt. Véh. which are obtained from outside the system (in wired form or by means of the CAN data bus), and uses these signals in order to generate an authorisation for activation of the engine mode Auth. Ond. of the electrical machine 3.

This authorisation is transmitted to the control circuit 13 of the power circuits 14, comprising the inverter 12, in order to validate the second control signal Pil. Ond.

In the same manner as previously, the second microprocessor 24 of the control circuit 13 acquires the request Dd. Ond. from the electronic control unit 17, 17a, in order to generate a second control signal Cd. Ond. of the engine mode to the inverter 12. In the same way as for the excitation, the process of validation of the order can be implemented in order to prevent the activation of the inverter as a result of a simple error by the first microprocessor 22 which is provided in the electronic control unit 17, 17a.

As previously, a validation process of this type is implemented in particular by the acquisition by the second microprocessor 24 of second information signals obtained from the data communication bus CAN of the vehicle.

The validation process can assume different forms, and in particular, by way of example:

Verification of the compatibility between the request for activation of the engine mode Dd. Ond. (starter or torque assistance), and vehicle and/or engine speed. (Each of these functions can be commanded only within a certain speed range of the vehicle and/or engine).

Or:

Verification of the compatibility between the request for activation of the engine mode Dd. Ond. (starter or torque assistance), and the state of the traction chain (each of these functions can be commanded only with a given state of the traction chain).

As a complement, both in the case of the first control signal Cd. Exc. of the excitation circuit, and in the case of the second control signal Cd. Ond. of the inverter 12, diagnosis of the activation of the power circuits 14 is carried out.

These diagnostic signals Diag2. Ond. and Diag2. Exc. thus permit implementation of a counter-measure (i.e. immediate action in the inverse sense of the command) within the control circuit 13.

However, a process of this type is not sufficient to cover all of the cases of premature action of one of the power circuits 14 (driver of the excitation circuit 10, or driver 12 of the phase windings 11 of the electrical machine 3).

In fact, in the case when the premature activation is derived from the second microprocessor 24, this counter-measure cannot be considered valid: the second microprocessor 24 which has created the premature order cannot be considered able to carry out the counter-measure satisfactorily.

It is for this purpose that diagnostic signals Diag1. Ond. and Diag1. Exc. are generated, which are transmitted to the electronic control unit 17, 17a.

In order to preserve the safety network, these diagnostic signals Diag1. Ond. and Diag1. Exc. are transmitted to the electronic control unit 17, 17a, each by means respectively of a second and third dedicated wired connection, and without resorting to any putting into form by the second microprocessor 24 of the control circuit 13.

The purpose of using dedicated connections of this type is to allow the first microprocessor 22 of the electronic control unit 17, 17a to decode any deficiencies; they make it possible to overcome a deficiency of the second microprocessor 24, and transmit the information without delay to the electronic control unit 17, 17a.

A device of this type makes it possible to diagnose a premature engine mode (starting—re-starting and/or torque assistance), and to overcome the situation of the duality of the condition on the inhibition line Auth. Ond.

The failsafe arrangement by the first diagnostic signal Diag1. Ond. is implemented as follows:

After detection, the first microprocessor 22 of the decision-making unit inhibits the engine mode by inhibiting its request for such a mode Dd. Ond. and/or by acting internally on the first decision-making circuit 23 with wired logic, thus producing the signal for authorisation for putting into effect the engine mode Auth. Ond. by means of the internal signal Inh. Ond.

It should be noted that, as previously stated, this mechanism does not prevent the premature command, but reduces very considerably the time of exposure to the risk.

As a complement to this entire process, the first microprocessor 22 of the electronic control unit 17, 17a will be able to inform, or make a request to inform the remainder of the vehicle (and therefore the client) of the deficiency in the system, and of the presence of the risk. This information is provided on the basis of detection of an unexpected value in the signal Diag1. Ond.

Similarly, the second diagnostic signal Diag1. Exc. makes it possible to detect closure of the excitation circuit in accordance with the inverter diagram.

FIGS. 4, 5, 6a and 6b represent the case when this second diagnostic signal Diag1. Exc. is obtained before the power driver of the excitation circuit 10.

As a variant, this second diagnostic signal Diag1. Exc. is advantageously obtained after the power driver 10.

The two configurations have advantages and disadvantages:

In the first configuration, the cost of the components which are necessary for the detection is low, since a low-power signal is involved, but there is no direct image of the state of the driver.

In the second configuration, the cost of the detection is higher, since it involves a power signal which must be conveyed to the decision-making unit, but a redundant measure of the excitation current is possible at the same time as the detection of the putting into use of the power driver 10.

The first configuration represented in FIGS. 4, 5, 6a and 6b combines the constraints of cost and detection of the risk, since this diagnosis makes it possible to detect premature activation of the excitation, which, in relation to premature starting and/or torque assistance, is equivalent to the loss of a single safety barrier.

To summarise, it will be noted that the method and device for failsafe control of an alternator-starter system 1, according to the invention, provides new, additional safety barriers in comparison with the barrier Auth. Ond. alone known according to the prior art, and represented in FIG. 3, i.e.:

implementation within the microprocessor 24 of the control circuit 13 of power circuits 14 for strategies of evaluation or diagnosis of the orders given by the first microprocessor 22;

implementation within the electronic control unit 17, 17a of a diagnosis of the activated state of the electrical machine which is independent of the state of the microprocessor 24 of the control circuit 13; and authorisation and validation of the excitation Auth. Exc.

Figure 7:
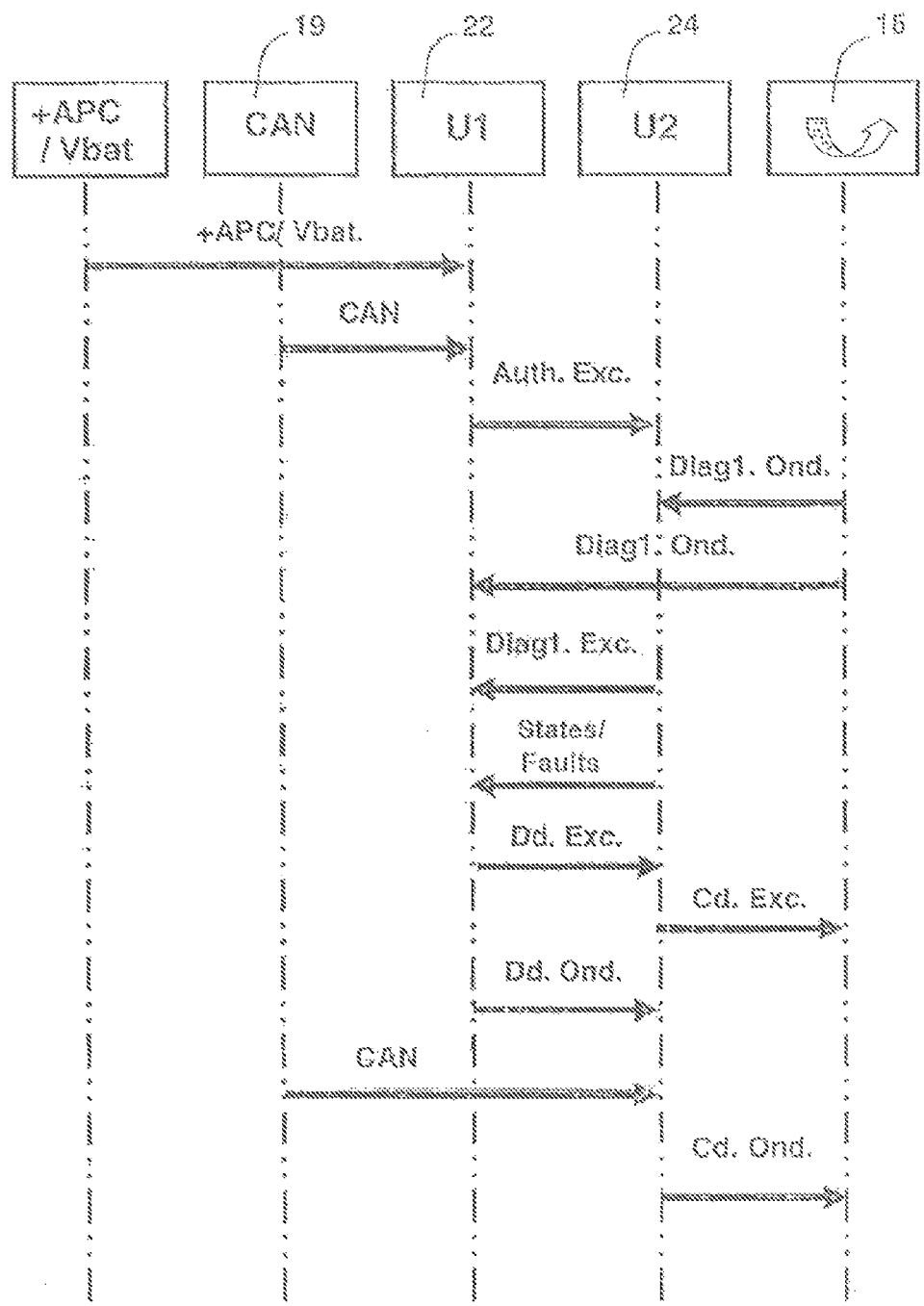
FIG. 7 is a diagram showing the transmission of the dedicated signals relating to the failsafe control method of a micro-hybrid system with recuperative braking and/or torque assistance, according to the invention.

The different control and diagnostic signals which are exchanged between the first and second microprocessors 22, 24, the data communication bus 19, and the means for detection of rotation 15 implemented by the invention, are represented schematically in FIG. 7.

The different control and diagnostic signals which are implemented by the invention are preferably produced as follows:

Dd. Ond, and Dd. Exc.

These first control signals are formed by the electronic control unit 17, 17a and transmitted by means of a (private or public) network to the control circuit 13 of the power circuits 14 (inverter 12 and excitation circuit 10).

These first control signals are also formed from the acquisition by different vehicle sensors (gearbox, brake, speed, battery and/or storage unit voltage, state of doors, etc.), and reflect the requested state of the system: Alternator or Regenerator mode (Excitation=activated state, Inverter=de-activated state); Idle_Stop or Cut-off_Alternator mode (Excitation=activated state, Inverter=de-activated state); Engine mode (Excitation=activated state, Inverter=de-activated state)).

On the other hand, the control circuit 13 returns (by means of the same network) to the electronic control unit 17, 17a state signals (Alternator, Regenerator mode, etc.) as well as information concerning its internal faults and modes and/or transitions rejected (state and fault signals (States/Faults)).

The rejected transitions indicated are in particular:

rejection of transition to generator or engine mode as the result of the presence of incompatibility between the information +APC received by the control circuit 13 and the request issued by the electronic control unit 17, 17a; and rejection of transition to engine mode as the result of the presence of incompatibility between the request issued by the electronic control unit 17, 17a and the vehicle and/or engine speed (speed outside the authorised range).

Auth. Exc.

As previously described, this second control signal is preferably produced from a contact signal +APC or Vbat, by switching a circuit of the SMART MOS type 30 by the first microprocessor 22 of the electronic control unit 17, 17a (according to the strategy implemented in this unit).

Diag.1 Ond.

This first diagnostic signal is preferably produced from the signal obtained from the position sensor 15 of the electrical machine 3. This signal is decoded by the first microprocessor 22 of the electronic control unit 17, 17a, in the same manner as by the second microprocessor 24 of the control circuit 13 for the power circuits 14 comprising the inverter 12, in an embodiment as shown in FIGS. 3, 5 and 6a.

In such a case, the electronic control unit 17, 17a receives and uses the second information signals CAN obtained from the vehicle, in order not to take this first diagnosis into account only in certain contexts.

By way of example, reference can be made to the following:

activation of an additional starter (in order to avoid "premature" detection of the starting carried out by this means);

the presence of a vehicle speed (in order to avoid "premature" detection of push starting carried out deliberately by the client);

estimation of the torque created by the remainder of the vehicle (in order to avoid "premature" detection of torque assistance variation which is normally created outside the (engine) system).

As a variant, another diagnostic signal of this type is produced from any signal which can be the image of the activation of the engine mode at the level of the electrical machine 3, and it can then replace the first diagnostic signal Diag1. Ond. processed by the first and second microprocessors 22, 24.

FIG. 6b applies this variant, which constitutes a second embodiment:

The differential measurement by the electronic control unit 17, 17a of the voltage of the energy storer 26 in an architecture of the micro-hybrid type is therefore also suitable for a diagnostic signal of this type, in particular in order to make the "torque assistance" mode failsafe, since the activation of the torque assistance involves use of the voltage stored, and therefore decrease of the latter.

In such a hypothesis, and in the same manner as previously described as far as the rotation of the machine 3 is concerned, the electronic control unit 17, 17a must receive an estimate of the power collected by the network charges Vbat+X (if this power exists), in order not to take into account in the diagnosis this power which is used elsewhere.

It should be noted that this variant embodiment is particularly advantageous in the case when the energy starer 26 and the DC/DC converter 29 of a single power unit are combined. In fact, in this case, all the signals referred to are internal signals, and it is not necessary to have additional lines.

Diag1. Exc.

This second diagnostic signal Diag1. Exc. is preferably produced by means of a diode circuit (diode and adaptation resistor).

Diag2. Ond. and Diag2. Exc.

These diagnostic signals are wired at the level of the electronics of the power circuits 14 (inverter 12 and excitation circuit 10). These are simple adaptations of signals, in order to be "re-injected" into the second microprocessor 24 of the control circuit 13 of the power circuits 14 (optionally at digital inputs).

Auth. Ond.

A transistor circuit 23 (logic gates) takes into account the transition of an input signal obtained from one of the vehicle sensors Capt. Véh. (gearbox sensor for example) to an invalid value, and the inhibition signal Inh_Ondul obtained from the first microprocessor 22 of the electronic control unit 17, 17a, in order to generate this control signal.

Inh. Ond.

As previously indicated, this control signal is generated by the first microprocessor 22 of the electronic control unit 17, 17a at the moment of detection of the first diagnostic signal Diag1. Ond.

The advantages of the above-described architecture, in association with FIGS. 4, 5, 6a and 6b are that:

the number of inputs/outputs necessary for the failsafe functioning of the control circuit 13 and of the power circuits 14 is minimised;

the control circuit 13 does not support alone the entire interface with the exterior of the system; and the implementation of an additional microprocessor is avoided.

It should also be noted that, within the context of a micro-hybrid system with recuperative braking and/or torque assistance, no input/output of the system is specific to one of these functionalities.

According to other aspects, the invention also concerns a failsafe control method and wired connections as described hereinafter:

A) A method for failsafe control by means of dedicated signals of an alternator-starter system 1, 27 coupled to a thermal engine 2 of a vehicle, the vehicle comprising at least one electronic control unit 17, vehicle sensors, a data communication bus 19 and an on-board electrical network, the alternator-starter system 1, 27 comprising at least one rotary electrical machine 3 which is provided with a means 15 for detection of rotation, power circuits 14 comprising at least one inverter 12 and an excitation circuit 10 which supplies the said rotary electrical machine 3, and a first control circuit 13 for the said power circuits 14, wherein the method consists of transmitting to the first control circuit 13 a first control signal Auth. Exc. which authorises the closure of the excitation circuit 10.

B) A method for failsafe control by means of dedicated signals of an alternator-starter system 1 coupled to a thermal engine 2 of a vehicle, according to the above point A), wherein the method additionally consists of transmitting to the first control circuit 13 and to the electronic control unit 17 a first diagnostic signal Diag1. Ond. supplied by the means 15 for detection of rotation and/or a third diagnostic signal Diag3. Ond., obtained from a voltage Vbat+X which supplies the inverter 12, and indicates rotation of the rotary electrical machine 3.

C) A method for failsafe control by means of dedicated signals of an alternator-starter system 27 coupled to a thermal engine 2 of a vehicle, according to the above point A), wherein the method additionally consists of transmitting to the first control circuit 13 and/or to a second control circuit 17a of energy conversion circuits contained in the alternator-starter system 27, a first diagnostic signal Diag1. Ond. supplied by the means for detection of rotation 15 and/or a third diagnostic signal Diag3. Ond., obtained from a voltage Vbat+X which supplies the inverter 12, and indicates rotation of the rotary electrical machine 3.

D) A method for failsafe control by means of dedicated signals of an alternator-starter system 1, 27 coupled to a thermal engine 2 of a vehicle, according to the above point C), wherein the method additionally consists of transmitting to the electronic control unit 17 or to the second control circuit 17a, via the first control circuit 13, a second diagnostic signal Diag1. Exc. which represents the state of a first control signal Cd.Exc. which commands the closure of the excitation circuit 10.

E) A method for failsafe control by means of dedicated signals of an alternator-starter system 1, 27 coupled to a thermal engine 2 of a vehicle, according to the above points C) or D), wherein the method additionally consists of transmitting state/fault signals States/Faults to the electronic control unit 17, or to the second control circuit 17a, via the first control circuit 13.

F) A method for failsafe control by means of dedicated signals of an alternator-starter system 1, 27 coupled to a thermal engine 2 of a vehicle, according to any one of the above points A) to E), wherein the method additionally consists of transmitting to the first control circuit 13 information signals CAN obtained from a data communication bus 19.

G) A method for failsafe control by means of dedicated signals of an alternator-starter system 1, 27 coupled to a thermal engine 2 of a vehicle, according to any one of the above points C) to E), wherein the method additionally consists of transmitting to the electronic control unit 17, or to the second control circuit 17a, a contact signal +APC/Vbat which is representative of switching on of the voltage of the on-board electrical network.

H) A method for failsafe control by means of dedicated signals of an alternator-starter system 1, 27 coupled to a thermal engine 2 of a vehicle, according to point G), wherein the first control signal Auth. Exc. is validated by means of the contact signal +APC/Vbat.

I) Wired connections of an alternator-starter system 1, 27 coupled to a thermal engine 2 of a vehicle, adapted for the implementation of the method according to any one of the above points A) to H), wherein the connections transmit the dedicated signals selected from amongst a group comprising:

the first control signal Auth. Exc;
the first diagnostic signal Diag1. Ond.;
the second diagnostic signal Diag1. Exc.;
the third diagnostic signal Diag3. Ond.;
the state/fault signals States/Faults; and
the contact signal +APC/Vbat.

J) Wired connections of an alternator-starter system 1, 27 coupled to a thermal engine of a vehicle, according to claim I), wherein at least one of the wired connections is a dedicated wired connection.

It will be appreciated that the invention is not limited simply to the preferential embodiments previously described. On the contrary, the invention incorporates all the possible variant embodiments which would remain within the context defined by the following claims.

The invention claimed is:

1. A method for failsafe control of an alternator-starter system (1, 27) coupled to a thermal engine (2) of a vehicle; the vehicle comprising at least one electronic control unit (17), vehicle sensors, a data communication bus (19) and an on-board electrical network (Vbat, Vbat+X); the alternator-starter system (1, 27) comprising at least one rotary electrical machine (3) provided with means (15) for detection of rotation, power circuits (14) comprising at least one inverter (12) and an excitation circuit (10) supplying the rotary electrical machine (3), and a control circuit (13) for controlling the power circuits (14); the method comprising the steps of:

generating by means of the electronic control unit (17) control signals (Dd. Exc., Dd. Ond., Auth. Exc., Auth. Ond.) to control the alternator-starter system (1, 27) on the basis of first information signals (Capt. Véh.) representative of a state of functioning of the vehicle, obtained from the vehicle sensors;

generating by means of the control circuit (13) control signals (Cd. Exc., Cd. Ond.) to control the power circuits (14) on the basis of diagnostic signals (Diag1. Ond., Diag2. Exc., Diag2. Ond.) representative of a state of functioning of the alternator-starter system;

generating the control signals (Dd. Exc., Dd. Ond., Auth. Exc., Auth. Ond.) by means of the electronic control unit (17) on the basis of at least one first diagnostic signal (Diag1. Ond.) from amongst the diagnostic signals (Diag1. Ond., Diag1. Exc., Diag2 Ond., Diag2. Exc.); and generating the control signals (Cd. Ond., Cd. Exc.) by means of the control circuit (13) on the basis of second information signals (CAN) obtained from the data communication bus (19).

2. The method for failsafe control according to claim 1, wherein at least one first control signal (Cd. Exc.) from amongst the control signals (Cd. Ond., Cd. Exc.) includes at least one second diagnostic signal (Diag1. Exc.) from amongst the diagnostic signals (Diag1. Ond., Diag1 Exc., Diag2. Ond., Diag2. Exc.).

3. The method for failsafe control according to claim 2, further comprising the steps of:

generating at least one first control signal (Dd. Ond., Dd. Exc.) from amongst the control signals (Dd. Exc., Dd. Ond., Auth. Exc., Auth. Ond.), by means of a first microprocessor (22) which is provided in the electronic control unit (17) and processing at least the first diagnostic signal (Diag1. Ond.) and the second diagnostic signal (Diag1. Exc.);

generating at least one second control signal (Auth. Exc). from amongst the control signals (Dd. Exc., Dd. Ond., Auth. Exc., Auth. Ond.), by means of a first wired logic decision-making circuit (23) which is provided in the control unit (17); and generating the control signals (Cd. Ond., Cd. Exc.) exclusively by means of a second wired logic decision-making circuit (25, 31) which is provided in the control circuit (13).

4. The method for failsafe control according to claim 3, further comprising the steps of:

generating the at least second control signal (Auth. Exc.) as a function of at least one first activation signal (Act. Exc.) from amongst activation and/or inhibition signals (Act. Exc., Inh. Ond.) which are generated by the first microprocessor (22), and a contact signal (+APC/Vbat) which is representative of switching on of the on-board electrical network; and generating the at least first control signal (Cd. Exc.) as a function of the at least second control signal (Auth. Exc.), and at least one first control signal (Pil. Exc.), from amongst control signals (Pil. Ond., Pil. Exc.) which are generated by a second microprocessor (24) which is provided in the control circuit (13).

5. The method for failsafe control according to claim 4, further comprising the step of transmitting state/fault signals (States/Faults) by means of the second microprocessor (24) to the first microprocessor (22).

6. The method for failsafe control according to claim 2, wherein the excitation circuit (10) is controlled by the first control signal (Cd. Exc.).

7. The method for failsafe control according to claim 1, wherein the first diagnostic signal (Diag1. Ond.) is supplied by means of the means (15) for detection of rotation.

8. A device for failsafe control of an alternator-starter system (1, 27) coupled to a thermal engine (2) of a vehicle, the device provided for implementation of the method according to claim 1, the vehicle comprising at least one electronic control unit (17), vehicle sensors, a data communication bus (19), and an on-board electrical network (Vbat, Vbat+X), the alternator-starter system (1, 27) comprising at least one rotary electric machine (3) provided with means (15) for detection of rotation, power circuits (14) comprising at least one inverter (12) and an excitation circuit (10) supplying the rotary electrical machine (3), and a circuit (13) to control the power circuits (14);

the electronic control unit (17) receiving first information signals (Capt. Véh.) representative of a state of functioning of the vehicle and obtained from the vehicle sensors, and generating control signals (Dd. Exc., Dd. Ond., Auth. Exc., Auth. Ond.) for the alternator-starter system (1, 27);

the control circuit (13) receiving diagnostic signals (Diag2. Exc., Diag2. Ond.) representative of a state of functioning of the alternator-starter system (1, 27), and generating control signals (Cd. Exc., Cd. Ond.) for the power circuits (14);

the second electronic control unit (17) additionally receiving at least one first diagnostic signal (Diag1. Ond.) from amongst the diagnostic signals (Diag1. Ond., Diag1. Exc., Diag2. Ond., Diag2. Exc.); and the control unit (13) additionally receiving second information signals (CAN) from the data communication bus (19).

9. The device for failsafe control according to claim 8, wherein at least one first control signal (Cd. Exc.) from amongst the control signals (Cd. Ond., Cd. Exc.) includes at least one second diagnostic signal (Diag1. Exc.) from amongst the diagnostic signals (Diag1. Ond., Diag1. Exc., Diag2. Ond., Diag2. Exc.).

10. The device for failsafe control according to claim 9, wherein the first control signal (Cd. Exc.) controls the excitation circuit (10).

11. The device for failsafe control according to claim 8, further comprising:

a first microprocessor (22) provided in the electronic control unit (17), which processes at least the first diagnostic signal (Diag1. Ond.), and the second diagnostic signal (Diag1. Exc.), and generating at least one first control signal (Dd. Ond., Dd. Exc.) from amongst the control signals (Dd. Exc., Dd. Ond., Auth. Exc., Auth. Ond.);

a first wired logic decision-making circuit (23) provided in the control unit (17), and generating at least one second control signal (Auth. Exc.) from amongst the control signals (Dd. Exc., Dd. Ond., Auth. Exc., Auth. Ond.); and a second wired logic decision-making circuit (25, 31) provided in the control circuit (13), and generating the control signals (Cd. Ond., Cd. Exc.).

12. The device for failsafe control according to claim 11, further comprising:

a first logic gate (30) which produces the at least second control signal (Auth. Exc.), as a function of at least one first activation signal (Act. Exc.) from amongst activation and/or inhibition signals (Act. Exc., Inh. Ond.) generated by the first microprocessor (22), and of a contact signal (+APC/Vbat), which is representative of switching on of the on-board electrical network (Vbat);

a second microprocessor (24) provided in the control circuit (13), and generates control signals (Pil. Ond., Pil. Exc.); and a second logic gate (31) which generates the at least first control signal (Cd. Exc.), as a function of the at least second control signal (Auth. Exc.), and at least one first control signal (Pil. Exc.) from amongst the control signals (Pil. Ond., Pil. Exc.).

13. The device for failsafe control according to claim 12, wherein the second microprocessor (24) transmits state/fault signals (States/Faults) to the first microprocessor (22).

14. The device for failsafe control according to claim 8, wherein first diagnostic signal (Diag1. Ond.) is provided by the means (15) for detection of rotation.

15. An alternator-starter system (1, 27) for a thermal engine (2) of a vehicle, the alternator-starter system being equipped with a failsafe control device provided for implementation of the method according to claim 1, the vehicle comprising at least one electronic control unit (17), vehicle sensors, a data communication bus (19), and an on-board electrical network (Vbat, Vbat+X), the alternator-starter system (1, 27) comprising at least one rotary electric machine (3) provided with means (15) for detection of rotation, power circuits (14) comprising at least one inverter (12) and an excitation circuit (10) supplying the rotary electrical machine (3), and a circuit (13) to control the power circuits (14);

the electronic control unit (17) receiving first information signals (Capt. Véh.) representative of a state of functioning of the vehicle and obtained from the vehicle sensors, and generating control signals (Dd. Exc., Dd. Ond., Auth. Exc., Auth. Ond.) for the alternator-starter system (1, 27);

the control circuit (13) receiving diagnostic signals (Diag2. Exc., Diag2. Ond.) representative of a state of functioning of the alternator-starter system (1, 27), and generating control signals (Cd. Exc., Cd. Ond.) for the power circuits (14);

the second electronic control unit (17) additionally receiving at least one diagnostic signal (Diag1. Ond.) from amongst the diagnostic signals (Diag1. Ond., Diag1. Exc., Diag2. Ond., Diag2. Exc.); and the control unit (13) additionally receiving second information signals (CAN) from the data communication bus (19).

16. The alternator-starter system (27) according to claim 15, additionally comprising a recuperative braking function of a micro-hybrid type.

* * * * *